MINIATURIZED PACKAGE CONTAINING A SOLID STATE OSCILLATOR AND A FREQUENCY MULTIPLIER

Filed Oct. 22, 1965

INVENTORS
CHARLES A. ADAMS
HUBERT E. HALLADAY
BY Mueller, Aichele & Rauner
ATTORNEYS United States Patent Office 3,393,357
Patented July 16, 1968

3,393,357

MINIATURIZED PACKAGE CONTAINING A SOLID STATE OSCILLATOR AND A FREQUENCY MULTIPLIER

Charles A. Adams, Scottsdale, and Hubert E. Halladay, Phoenix, Ariz., assignors to Motorola, Inc., Franklin Park, Ill., a corporation of Illinois Filed Oct. 22, 1965, Ser. No. 501,857
5 Claims. (Cl. 321—69)

ABSTRACT OF THE DISCLOSURE

A microwave source having a first cavity with a solid state oscillator coupled to a second microwave cavity disposed along the oscillator cavity and interconnected by a strip transmission line. A varactor semiconductor-type frequency-multiplier element is supported by a filter element within the second cavity and receives signals from the strip transmission line. The strip transmission line is removable to permit ready access to the varactor element. The second cavity has an interdigitated type filter for reducing size. The supporting filter element is bifurcated to provide axial adjustment of the varactor multiplier element for impedance matching.

This invention pertains generally to a microwave signal source and more particularly to a miniature microwave signal source for use in miniaturized electronic equipment such as radar transponders.

With the advent of space vehicles, there has been a continuing program within the electronic industry to produce equipment such as radar transponders and beacon local oscillators in miniaturized packages to increase the amount of electronic equipment that can be carried on such a vehicle while reducing the weight and space requirements. Further, such equipment must be extremely rugged as it is subjected to severe vibration, shock and acceleration conditions. One such radar transponder is described in copending application Ser. No. 500,572 filed Oct. 22, 1965 filed of even date herewith and assigned to the assignee of this application.

It is an object of this invention to produce an improved miniaturized microwave signal source.

A further object is to provide a very high frequency source of local oscillations for a receiver which is of extremely rugged construction.

It is another object to produce a microwave signal source for use with a radar transponder and the like that is efficient, compact, lightweight and can be effectively adapted into devices that have space limiting requirements.

A feature of this invention is a microwave signal source having an ultra high frequency solid state oscillator and frequency multiplier coupled together by a strip transmission line that matches the impedance thereof.

Another feature of this invention is a microwave signal source having a first section housing the oscillator and including a first hollow conducting structure with a substantially rectangular cross-section, and a second section including a second hollow conducting structure having a substantially rectangular cross-section which houses a varactor diode frequency multiplier and an interdigital filter which selects the desired harmonic signal from the multiplier. The strip transmission line includes first and second ground planes one of which is formed by a wall of each of the first and second hollow conductor structures, thereby providing in a single compact unit the microwave signal source.

A further feature of this invention is a microwave signal source having a variable capacitor mounted in one end wall of the second hollow conductor and in electrical contact with the input element of the interdigital filter which supports the varactor diode. Variation of the capacity provides broad band fundamental frequency tuning of the varactor multiplier.

Figures 1, 2, 3, 4, 5:
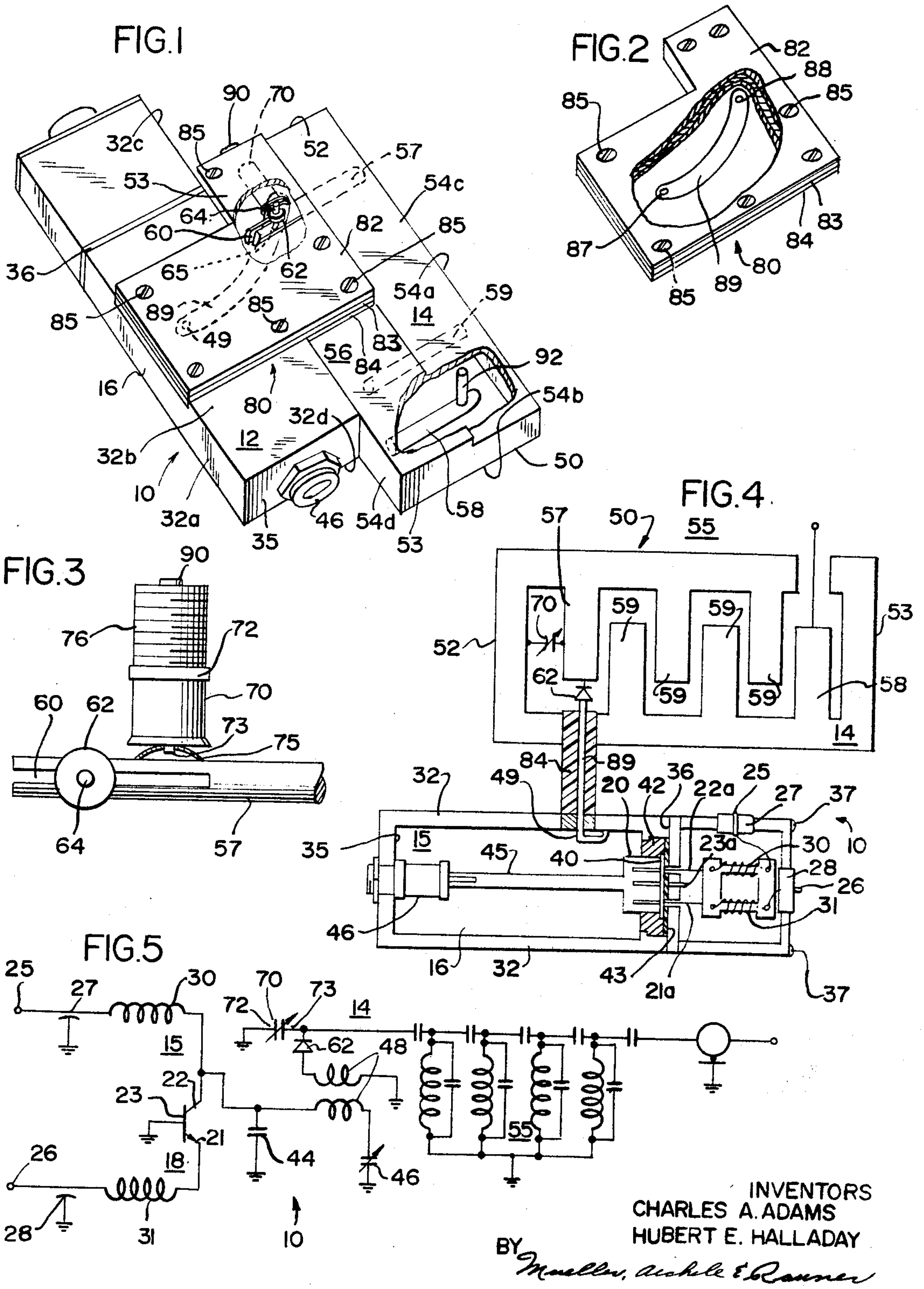
FIG. 1 is a perspective view of a microwave signal source of this invention, partly broken away to disclose interior details.
FIG. 2 is a perspective view of the strip transmission line in accordance with this invention, partly broken away.
FIG. 3 is an enlarged top plan view of the variable tuning device of the frequency multiplier in accordance with this invention.
FIG. 4 is a combination structural and schematic wiring diagram of the device of FIG. 1.
FIG. 5 is a schematic wiring diagram of the device of FIG. 1.

In accordance with one embodiment of this invention, a microwave signal source includes a first section housing an ultra high frequency solid state oscillator and having an elongated first hollow conducting structure with a substantially rectangular cross-section defined by side walls and end walls. A second section of the signal source includes a second elongated conducting structure with a substantially rectangular cross-section also defined by side walls and end walls. An impedance matching strip transmission line couples the generated signal from the oscillator to a varactor diode in the second conducting structure. The diode is forward conducting to enhance its non-linearity and functions as a frequency multiplier. An interdigital filter coupled to the output of the diode selects the desired harmonic to be coupled from the microwave signal source. A variable capacitor is mounted in one end wall of the second conducting structure and is in electrical contact with the input element of the filter, and hence, the varactor. The capacitor is varied to tune the varactor to the desired fundamental frequency. Other structural aspects of the device are unique. For instance, the input element of the filter is slotted to form a clip for receiving the output terminal of the diode so that the diode is not only electrically connected to the filter, but it is also mechanically supported thereby. In addition, one of the ground planes of the strip transmission line is formed by a portion of a side wall of each of the first and second hollow conducting structures so that the two sections are joined together in a compact unit for easy mounting into a limited space.

A specific embodiment of this invention is illustrated in FIGS. 1 through 5 of the drawing. The microwave signal source 10 has a first section 12 and a second section 14. First section 12 houses an ultra high frequency oscillator or cavity resonator 15 (FIGS. 4, 5) and includes a hollow conducting structure 16 having a substantially rectangular cross-section. A transistor 18 has a conducting housing 20 and an emittter electrode 21, collector electrode 22 and base electrode 23. The leads extending from emitter, collector and base electrodes are designated 21*a*, 22*a* and 23*a* in FIG. 4. Potentials applied to terminals 25 and 26 are bypassed by feedthrough capacitors 27 and 28, and coupled through RF chokes 30 and 31, to the collector electrode 22 and the emitter electrode 21 of the transistor 18. There may be mutual coupling between coils 30 and 31 to enhance the oscillation action in transistor 18. The RF chokes and bypass capacitors isolate the ultra high frequency signal developed by the oscillator from the source of bias potential. The base electrode 23 is connected to a reference potential and the conducting housing 20 is in contact with the collector electrode 22.

The hollow conducting structure 16 is bounded by end walls 35 and 36 which are secured by screws 37 into the side walls 32*a*, *b*, *c* and *d*. However, the walls 35 and 36 could be made integral therewith to eliminate the screws. The case flange 40 of transistor 18 is held in place by insulating packing 42 with a dielectric washer 43 positioned between the flange 40 and the end wall 36 of the conducting structure 16. The packing 42 and washer 43 may be made of an insulating material such as mica, Mylar or Rexolite. This washer acts as a dielectric of a capacitor, (schematically indicated at 44 in FIG. 5) and together with the internal capacitance between the collector 22 and base 23 of transistor 18 minimizes the reactive effects of the transistor output admittance, caused by temperature and power supply variation, on the frequency of oscillation.

An elongated conducting member 45 is mounted in electrical contact with the transistor conducting housing 20, and extends coaxially within the hollow conducting structure 16. Variable capacitor 46 couples the coaxial conductive member 45 to end wall 35 of the hollow elongated structure 16. This results in the hollow conducting structure 16, the coaxial member 45 and the variable capacitor 46 conjunctively forming a resonant tank circuit. This tank circuit is shown schematically in FIG. 5, with the coils 48, representing the inductance of the hollow conducting structure 16 and the coaxial member 45, coupled to the variable capacitor 46.

When the transistor 18 conducts, the collector electrode 22 provides a conductive connection to the resonant tank circuit consisting of the coils 48 and capacitor 46. The resonant frequency of the tank circuit determines the frequency of oscillation of the device and may be varied over a wide range, for instance, 1.5 to 2.0 gc., by adjusting capacitor 46. The signal is fed back from the output circuit to the input circuit of the transistor with both input and output signals being of a proper phase and magnitude to sustain oscillation.

Signals from the oscillator are coupled from the conducting structure 16 by an output coupling loop 49 located at the approximate position of maximum amplitude of a voltage standing wave and a current maximum.

The second section 14 of the signal source 10 includes an elongated second hollow conducting structure 50 having a substantially rectangular cross-section with end walls 52 and 53 and side walls 54, *a*, *b*, *c* and *d*. Mounted within the conducting structure 50 is an interdigital bandpass filter 55 of the type described in a paper by George L. Matthaei, "Interdigital Bandpass Filter" I.R.E. Transactions P.G.M.T.T.; November 1962, p. 479. The filter 55 has an input element 57, an output element 58 and a plurality of intermediate elements 59 spaced therebetween. Each of the elements 59 of the filter is a TEM mode strip line resonator located between parallel ground planes which are also two side walls 54*a* and 54*c* of the conducting structure 50. Each resonator is a quarter-wavelength long at the mid band frequency of the desired bandpass and is short circuited at one end and open circuited at the other. Coupling is achieved by way of the fields fringing between adjacent resonator elements. As was mentioned, each element serves as a resonator with the exception that the input 57 and output 58 elements have an impedance matching function. A schematic representation of the filter 55 is shown in FIG. 5.

The input element 57 of the filter 55 is of a unique construction in that it has a slot 60 in one end (FIG. 3). A non-linear reactance means, such as the varactor diode 62, functions as a frequency multipleir and has an input terminal 64 and an output terminal 65. The diode 62 is mounted to the filter element 55. This is accomplished by spreading the slotted end of the element 57 with the output terminal 65 so that the element 55 behaves as a clamp to physically support the diode 62. The output terminal 65 is, of course, also electrically connected to the filter input 57 at this point. A portion 56 of the side wall 54*c* of the conducting structure 50 is thicker than the remaining portion of that side wall. Therefore, clearance for the dioce 62, when mounted on element 57, is possible by providing an aperture 53 (FIG. 1) through the thick portion 56 of side wall 54*c*.

Mounted in the end wall 52 of the second conducting structure 50 is a screw type variable capacitor 70. One side 72 of the capacitor 70 is connected to a reference potential at the end wall 52. The other side 73 is electrically connected to the filter input elements 57 through a metal washer 75 (FIG. 3). The capacitor 70 is threaded into the end wall 52 by threads 76 so that it can be tightened securely to fix the washer 75 between the capacitor 70 and filter element 57. Capacitor 70 therefore is electrically connected to the input filter element 57 through the washer 75 and may be varied by turning the screw 90.

A strip transmission line 80 (FIG. 2) is used to couple the ultra high frequency signals from the oscillator 15 to the varactor 62. The line 80 acts as an impedance match between the oscillator and the diode varactor 62 and serves as a frequency determining element in the varactor 62 input circuit. The line 80 includes a first ground plane 82, a first layer of dielectric 83, a second layer of dielectric 84 and a second ground plane which is formed by the side walls 32*b* of structure 16 and side wall 54*c* of structure 50. Screws 85 join together the strip line structure 80 and extend into the walls of the two hollow conducting structures 16 and 50, thereby joining together in a compact unit the two sections 12 and 14 of the signal source 10. Apertures 87 and 88 are located at either end of the conductive material 89 forming the transmission line (FIG. 2) and receive the output coupling loop 49 of the oscillator 15 and input terminal 64 of the diode 62.

In operation, the ultra high frequency signal is coupled from the output coupling loop 49 of oscillator 15 to the input terminal 64 of the varactor diode 62 by strip line 80. The diode 62 is operated at zero bias, resulting in forward conduction, which enhances the nonlinear operation of the diode thereby providing efficient harmonic generation or frequency multiplication. A variable capacitor 70 is adjusted by the screw 90 to tune the varactor diode 62 to a broadband fundamental frequency. Only a single adjustment of the capacitor 70 is necessary for any desired bandwidth. The proper harmonic generated in the diode 62 is selected by the broad bandpass filter 50, and it rejects all unwanted harmonics. A conductive pin 92 is connected to the output element 58 of this filter 55 and functions to couple the selected harmonic from the mircowave signal source 10. It should be noted that no idler circuits are required in the multiplier. All spurious harmonics are dissipated within the conducting structure 50 without lowering the efficiency of the device.

Data on one unit which was constructed in accordance with this invention is as follows; it should be understood that this data is purely illustrative and is not meant to limit the invention in any manner:

| | | |
|---|---|---|
| First section **12** of microwave signal source **10**: | | |
| Overall length | inches | 1.5625 |
| Overall width | do | 0.5 |
| Maximum height | do | 0.5 |
| Section **14** of microwave signal source **10**: | | |
| Overall length | do | 1.375 |
| Overall width | do | .580 |
| Maximum height | do | .394 |
| Microwave signal source **10**: | | |
| Overall length | do | 1.875 |
| Overall width | do | 1.125 |
| Maximum height | do | 0.5625 |
| Frequency of oscillator **15** | gc | 1.3–1.6 |
| Frequency from signal source **10** | gc | 5.4–5.9 |
| Output power from signal source **10** | mw | 4–5 |

What has been described is an improved miniaturized microwave signal source capable of producing microwave signals for use with a radar transponder and the like that is efficient, compact, lightweight and can be effectively adapted in areas that have space limiting requirements.

We claim:

1. A microwave signal source including in combination, a first section including ultra high frequency oscillator means and having an elongated first hollow conducting structure with a substantially rectangular cross-section and end walls, microwave coupling means for coupling said ultra high frequency signal from said first hollow conducting structure, a second section including an elongated second hollow conducting structure having a substantially rectangular cross-section and end walls, interdigital filter means having a plurality of interdigitated filter elements each having an axis positioned in said second conducting structure and having an input and an output, multiplier means including nonlinear reactance means having input and output terminals and being mounted in said second conducting structure, said nonlinear reactance means being mechanically supported by and electrically connected to one of said filter means elements and extending transverse to said axis of said one element, a strip transmission line connecting said coupling means of said cavity resonator to said input terminal of said non-linear reactance means, said strip transmission line providing an impendance match between said oscillator means and said reactance means, said multiplier means multiplying said ultra high frequency signals from said oscillator means and said filter means selecting a desired harmonic frequency, and output means coupled to said output of said filter means for coupling said multiple frequency signals from said second conducting structure.

2. The microwave signal source of claim 1 further including tuning means for broad band fundamental frequency tuning of said multiplier means, said tuning means including a variable capacitor mounted in one end wall of said second conducting structure and in electrical contact with said input element of said filter means supporting said nonlinear reactance means.

3. The microwave signal source of claim 1 wherein one of said filter means elements being an input element and another of said filter means elements being an output element, said input element having a slot therein forming a clip for receiving the output terminal of said nonlinear reactive means to support same, with said nonlinear reactive means being slidable along the axis of said input element, and said output means from said second conducting structure being electrically coupled to said output element of said filter.

4. The microwave signal source of claim 1, wherein said strip transmission line includes first and second layers of dielectric material with a conductor therebetween and first and second ground planes, one of said first and second ground planes being formed by a portion of a wall each said first and second hollow conducting structures, said structures being side-by-side in their respective elongated directions and said strip transmission lines extending transversely to said elongated directions, and means fastening said strip transmission line, said first and second layers of dielectric material and said first and second ground planes together thereby joining in a single unit said first and second sections of the microwave signal source.

5. A microwave signal source including in combination, a first section including a solid state element and a first elongated hollow conducting cavity resonator structure, coupling means for coupling signals from said first conducting structure, a second section including a second elongated hollow conducting structure with signal energy flow being along an elongated direction, frequency multiplier means including nonlinear reactive means having aligned input and output terminals extending transverse to said elongated direction and being inside said second conducting structure, filter means positioned in said second structure and including input connector means and output connector means, a strip transmission line connecting said coupling means of said cavity resonator structure to said input terminal of said nonlinear reactive means and extending transverse to said elongated direction, means connecting said output terminal of said reactive means to said input means of said filter means, said first and second conducting structures being contiguous and extending in parallel directions along the respective elongated directions and having transversely extending portions which form one ground line for said strip transmission line, said strip transmission line means other than said one ground plane being removable from said one ground plane for permitting access to said nonlinear reactive means, and output means coupled to said output connector means of said filter means for coupling signals selected by said filter means from said second conducting structure.

References Cited

UNITED STATES PATENTS

| | | | |
|---|---|---|---|
| 2,926,312 | 2/1960 | Brand et al. | 331—77 |
| 2,954,468 | 9/1960 | Matthaei | 333—73 X |
| 3,085,205 | 4/1963 | Sante | 321—69 X |
| 3,204,199 | 8/1965 | Lance | 331—76 X |
| 3,268,795 | 8/1966 | Hudspeth et al. | 321—69 |
| 3,286,156 | 11/1966 | Barkes | 321—69 |
| 3,311,812 | 3/1967 | Geiszler et al. | 321—69 |

LEE T. HIX, *Primary Examiner.*

G. GOLDBERG, *Assistant Examiner.*